March 24, 1931. H. W. HOW 1,797,232
GAS AND LIQUID SEPARATOR
Filed March 18, 1930
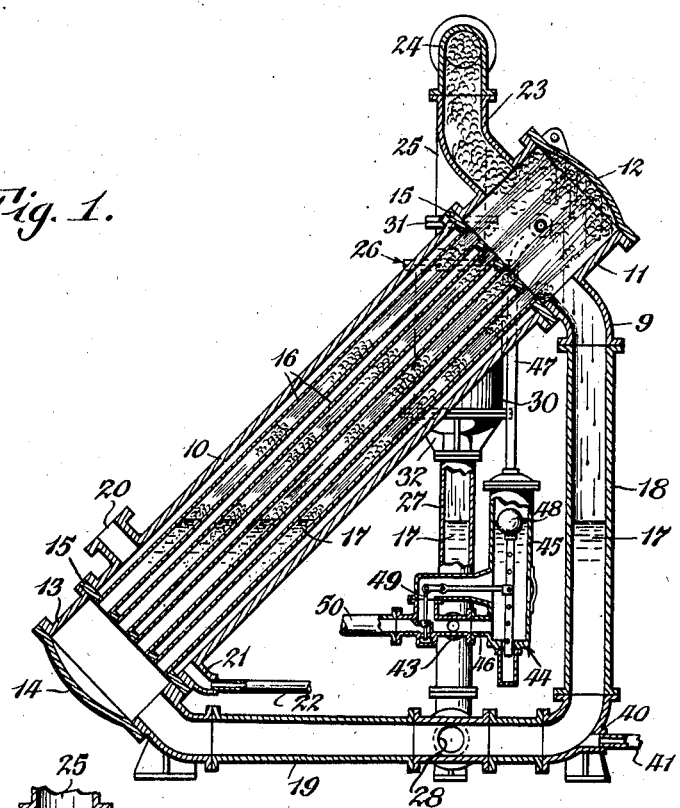
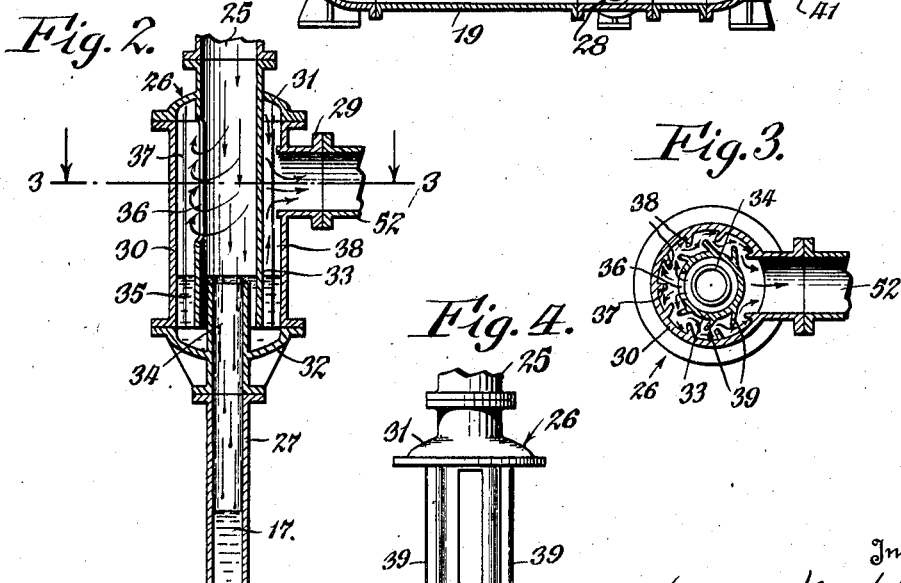
Inventor
Harlan W. How
By Popp & Powers
Attorneys Patented Mar. 24, 1931

1,797,232

UNITED STATES PATENT OFFICE

HARLAN W. HOW, OF WARREN, PENNSYLVANIA, ASSIGNOR TO STRUTHERS WELLS-TITUSVILLE CORPORATION, OF WARREN, PENNSYLVANIA, A CORPORATION OF MARYLAND

GAS AND LIQUID SEPARATOR

Original application filed July 11, 1929, Serial No. 377,540. Divided and this application filed March 18, 1930. Serial No. 436,710.

This invention relates to a separator for separating gases and liquids and more particularly to a separator which is designed for use in connection with a high velocity evaporator and is designed to utilize the velocity of the vapor and the entrained liquor therein for separating the liquor from the vapor although the separator can also be used in other installations where it is desired to separate entrained liquid from a gas.

This application is a divisional application of application Serial No. 377,540, filed by me on July 11, 1929, for improvements in evaporators.

The principal object of the present invention is to provide means for separating the liquor from the vapor of high velocity evaporator which will handle large amounts of vapor and entrained liquor at high velocities and will not only insure the separation of large and small shots or drops of liquor that come over with the vapor, but also insure the separation of the liquor which is entrained in mist form with the vapor, this separator, while particularly adapted for use in connection with an evaporator, being capable of use in other fields where the separation of entrained liquid from a vapor or gas is desired.

Another purpose is to provide such separators which are particularly adaptable for use between the different effects of a multiple effect evaporator, the separators being designed to maintain the passages at the proper area, and maintain high velocities throughout the apparatus.

Another object is to provide such a separator which is simple and efficient in its action, which is inexpensive in construction and which will remain in good working condition for a long period of time.

In the accompanying drawings:

Figure 1 is a vertical section through a high velocity evaporator equipped with a vapor separator made in accordance with the present invention.

Figure 2 is a fragmentary vertical section through the vapor separator and its connections with the high velocity evaporator.

Figure 3 is a horizontal section taken on line 3—3, Fig. 2.

Figure 4 is a side elevation of the inner member or baffle employed in the vapor separator shown in Figs. 2 and 3.

Similar numerals refer to like parts in each of the several views.

In its general organization this invention comprises a vapor separator having its inlet adapted to be connected to the vapor outlet of a high velocity evaporator and to receive the vapor and entrained liquor therefrom and having a liquor outlet in line with the inlet so that drops or shots of liquor are separated directly and also having a series of baffles between the inlet and its vapor outlet so that any remaining entrained liquor is removed from the vapor by whipping it back and forth before leaving the vapor outlet.

The separator forming the subject matter of the present application is shown as arranged to separate the entrained moisture from an inclined high velocity evaporator which is more particularly described in my copending application Ser. No. 377,540, filed July 11, 1929, and is generally organized as follows:

The numeral 10 represents an inclined cylindrical shell to the upper end of which is secured an upper cylindrical header 11 having an upper cover 12 at its outer end and the cylindrical shell 10 having a lower cylindrical header 13 which has a lower cover 14 at its outer end. These parts are bolted or secured together in any suitable manner and between the headers 11, 13 and the cylindrical shell 10 upper and lower tube sheets 15 are interposed. These tube sheets support a plurality of tubes 16 which extend through the tube sheets and are expanded or otherwise suitably secured thereto.

The upper vapor header 11 is formed to provide an outlet 9 for the return of the entrained liquor to the liquor head 17, this outlet 9 being connected to a vertical return pipe 18 which is connected at its lower end to the lower header 13 of the evaporator by a horizontal pipe 19. The liquor head 17 is therefore in the lower part of the tubes, the lower header 13, the horizontal pipe 19 and the lower part of the vertical return pipe 17. In order to secure the best results, a low hydrostatic head is maintained, the liquor level, as best shown in Fig. 1, being at from one-fifth to one-third of the height of the tubes 16, depending upon the character of the material being evaporated.

The steam for evaporating the liquor in the tubes 16 is admitted through a steam inlet 20 and the condensed water from the shell 10 passes out through a condensate outlet 21 which is formed in the lower part of the shell 10 and is connected with a condensate pipe 22.

The liquor in the tubes 16 is caused to boil by the live steam surrounding these tubes and liquor is thrown up and carried forward by this boiling action and the velocity of the vapors generated. Since a low hydrostatic head is maintained in the tubes, the upper part of the tube surfaces is under no hydrostatic head whatever, and for this reason perform at the highest efficiency in evaporating the liquor thrown up by the boiling liquor head in the lower parts of these tubes.

The vapor with a certain amount of entrained liquor in the form of large shots and mist is projected or blown out of the upper ends of the tubes 16 at a high velocity, as best shown in Fig. 1. This projected vapor and entrained liquor strikes the upper cover plate 12 and by reason of the high velocity and the greater part of the entrained liquor striking the upper cover plate 12 is separated from the vapor and flows down the cover plate 12, and along the upper header 11 to the outlet 9 from which it flows down the vertical return pipe 18 and is returned to the liquor head 17 in the lower part of this vertical return pipe.

The vapor with such entrained liquor as is not separated by being thrown against the upper cover plate, passes out through a vapor outlet 23 formed in the upper side of the upper vapor header 11 and passes around a bend 24 to a vertical pipe 25 which connects with a separator indicated generally at 26. This separator 26 which embodies the present invention is designed to separate all of the remaining liquor entrained in the vapor as either mist or in the form of large shots, as hereinafter described, and the liquor separated from the vapor is returned to the head 17 by a vertical pipe 27 which is connected to the lower end of the separator 26 and at its lower end is connected by a horizontal pipe 28 to the horizontal pipe 19 below the inclined shell 10. The separator 26 is provided at one side with a vapor outlet 29 from which the vapor, which is substantially free from any entrained liquor, is withdrawn.

The separator 26 is entirely efficient in its action and positively prevents entrained liquids, either as a mist or in the form of large shots from passing over with the vapor and while it is shown as used in connection with an evaporator, it is obvious that it can be used wherever it is desired to separate entrained liquid from a gas traveling at high velocity as well as in connection with an evaporator. This separator 26 is preferably constructed as follows:

The numeral 30 represents a vertically disposed cylindrical shell in one side of which the vapor outlet 29 is formed. At its upper end this vapor separator shell 30 is closed by a head 31 and at its lower end by a head 32, these heads being secured to the shell in any suitable manner. The upper head is connected to the pipe 25 through which the vapor with its entrained liquor is introduced into the separator and is formed to provide a depending tubular baffle 33 which extends substantially to the lower head 32. The lower head is connected to the liquor outlet 27 and is formed to provide an upwardly extending overflow pipe 34 which projects up into the tubular baffle 33. The liquor 35 separated from the vapor collects in the lower part of the separator and since the overflow pipe 34 is above the lower end of the tubular baffle 33, a liquor seal is provided, this liquor seal eliminating the necessity of making a mechanically tight joint at the bottom.

Since the vapor with its entrained liquor enters the tubular baffle 33 at high velocity, it is apparent that any large shots of entrained liquor continue in their downward path and pass directly through the overflow pipe 34 into the vertical pipe 27 where they join the liquor head 17.

The vapor with the remaining entrained mist thereupon passes through a vertical slot 36 which is provided in the side of the tubular baffle 33 opposite to the vapor outlet 29 in the shell 30.

As best shown in Fig. 3, the shell 30 of the separator is formed to provide an inwardly extending, vertical dividing rib 37 which projects towards the center of the slot 36 and divides the vapor and mist emerging from the slot into two streams, these streams passing between the tubular baffle 33 and the shell 30 on opposite sides of the tubular baffle 33. Along the path of each of these streams, the separator shell is formed to provide a plurality of spaced inwardly projecting ribs 38 which extend obliquely against the flow of the vapor and entrained liquor. Between these ribs 38, the tubular baffle 33 is formed to provide a plurality of similar ribs 39. It is therefore apparent that as the two streams of vapor with the entrained liquor pass from the slot 36 to the outlet 29, they are whipped back and forth between the ribs 38 and 39 and as the streams are traveling at a high rate of speed any remaining entrained mist is thrown against the ribs where it collects and flows down to the water trap 35 and over the overflow into the main liquor head 17 to be recirculated.

Any suitable means, such as a liquor outlet 40 at the foot of the return pipe 18 can be provided for withdrawing the liquor when it has been evaporated to the required degree. The admission of liquor is preferably controlled so as to maintain a constant head of liquor by a float valve indicated generally at 44 in the liquor inlet 43. This float valve, as shown, is composed of a float valve chamber 45 which is connected at its lower end to the liquor head by a branch line 46 and at its upper end is connected by a pipe 47 with the upper header 11 so that the level in the float chamber is always the same as the main liquor head 17. In this float valve chamber is arranged a float 48 which has an adjustable connection with an inlet valve 49, this connection being such that when the liquor head 17 drops, the float 48 opens the valve and permits liquor from the inlet pipe 50 to enter the liquor inlet 43 and restore the liquor head 17 to its proper level.

The vapor with the entrained moisture removed can be withdrawn from the vapor outlet 52 by any suitable form of vacuum pump with either a barometric or a jet condenser. The separator can also be used between the effects of a multiple effect evaporator in which case the passages through the separator are of such size as to insure the vapors traveling at a high uniform velocity through the apparatus and thereby provide evaporation of the liquor at the highest efficiency.

The separator, whether used in single or multiple effect evaporators, completely separates out the entrained moisture from the vapor, effects this separation while the vapor is traveling at high velocity, offers the minimum resistance to the flow of the vapor which at high velocities is an important consideration, is inexpensive to construct and install and can easily be maintained in good working condition.

I claim as my invention:

1. A separator, comprising a shell, a body in said shell, an inlet in said inner body for receiving a gas and entrained liquid at high velocity, a liquid outlet for said inner body, said inner body being provided with an opening, a gas outlet connected with said shell and communicating with the space between said inner body and said shell, and baffle means arranged in said space between said inner body and said shell and between said opening and said gas outlet.

2. A separator, comprising a shell, a body in said shell, an inlet in said inner body for receiving a gas and entrained liquid at high velocity, a liquid outlet for said inner body, said inner body being provided with an opening, a gas outlet connected with said shell and communicating with the space between said inner body and said shell, and ribs provided on the outside of said inner body and the inside of said shell, said ribs being arranged to whip the gas passing from said opening to said gas outlet back and forth and remove any entrained liquid therefrom.

3. A separator, comprising a shell, a body in said shell, an inlet in said inner body for receiving a gas and entrained liquid at high velocity, a liquid outlet for said inner body, said inner body being provided with an opening, a gas outlet connected with said shell and communicating with the space between said inner body and said shell, baffle means arranged in said space between said inner body and said shell and between said opening and said gas outlet, and means for conducting the liquid removed by said baffle means from said gas to said liquid outlet.

4. A separator, comprising a shell, a body in said shell, an inlet in said inner body for receiving a gas and entrained liquid at high velocity, a liquid outlet for said inner body, said inner body being provided with an opening, a gas outlet connected with said shell and communicating with the space between said inner body and said shell, ribs provided on the outside of said inner body and between said opening and said gas outlet, said ribs being angularly disposed to project against the path of the gas between said inner body and said shell, ribs provided on the inside of said shell between the ribs on said inner body and also angularly disposed to project against the path of the gas between said inner body and said shell, whereby said gas is whipped back and forth between said ribs and the entrained liquid removed therefrom.

5. A separator, comprising a shell, an inner body depending from the upper part of said shell, and having an open lower end, an overflow pipe projecting upwardly from the bottom of said shell and above the lower end of said inner body, an inlet at the upper end of said inner body for receiving a gas and entrained liquid at high velocity, a liquid outlet connected with said overflow pipe, means for preventing the passage of gas through said overflow pipe, an opening in one side of said inner body and gas outlet on the side of said shell opposite said opening, and baffle means in the passage between said shell and said inner body and between said opening and said gas outlet whereby the entrained liquid is removed from the gas passing from said opening to said gas outlet, said overflow pipe providing a liquid seal for the lower end of said inner body.

In testimony whereof I hereby affix my signature.

HARLAN W. HOW.